ered manufac# UNITED STATES PATENT OFFICE.

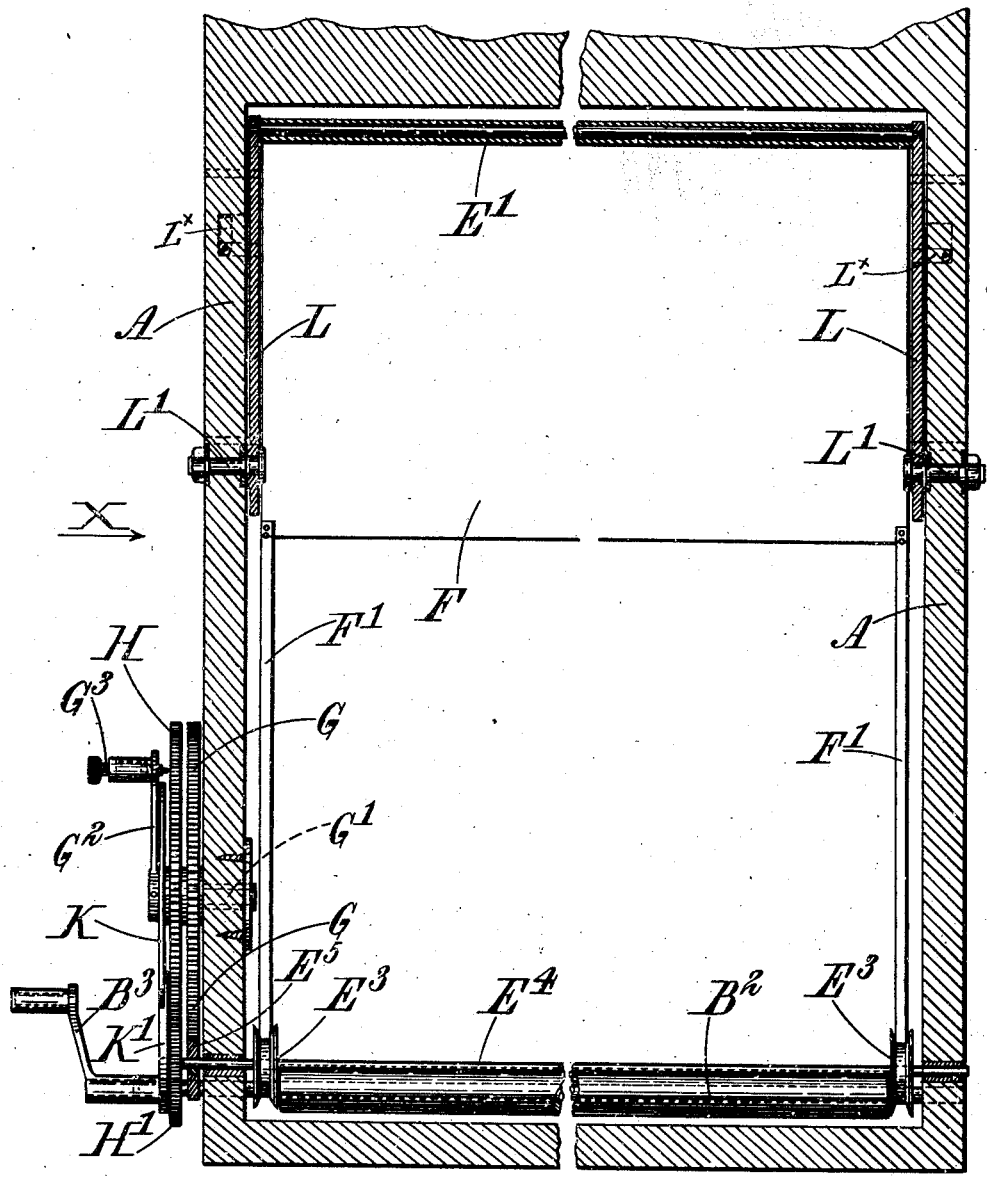

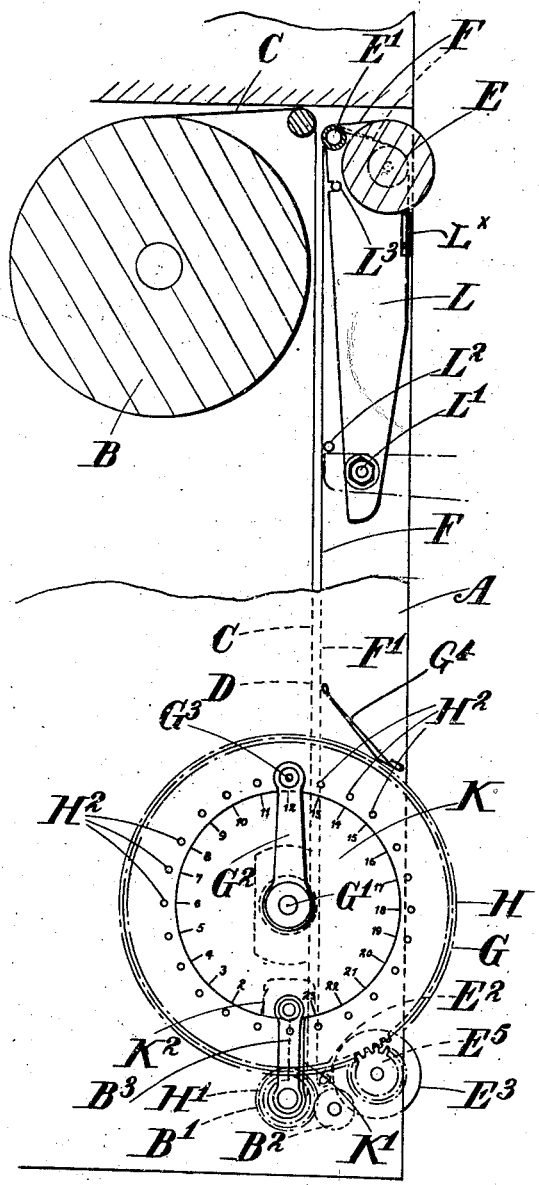

LEONARD MILES, OF COVENTRY, ENGLAND.

FEEDING AND MEASURING DEVICE FOR ROLLS OF SENSITIZED STRIPS EMPLOYED IN PHOTOGRAPHIC CAMERAS.

1,344,207. Specification of Letters Patent. Patented June 22, 1920.

Application filed July 7, 1919. Serial No. 309,015.

*To all whom it may concern:*

Be it known that I, LEONARD MILES, a subject of the King of England, residing at Coventry, England, have invented certain new and useful Improvements in Feeding and Measuring Devices for Rolls of Sensitized Strips Employed in Photographic Cameras, of which the following is a specification.

This invention is for improvements in or relating to feeding and measuring devices for rolls of photo-sensitive material as employed in photographic cameras, and has particular reference to the type of apparatus used for making copies of drawings or the like direct upon a portion of sensitized strip. In such apparatus the camera is provided with a roll of sensitized strip, the free end of which is engaged by a winding-off roller which latter also acts to hold the strip taut in the focal plane during exposure. In one form of such apparatus where photo-copies are required of smaller dimensions than that for which the apparatus is constructed, a screen is employed, which when placed in the focal plane covers half of the sensitized strip, and the winding-off roller is provided with an index and stop by the use of which only half the normal amount of paper can be wound off.

This arrangement, however, only provides for two lengths of strip, so that where the required photo-copy is any intermediate length, other than half the maximum, considerable waste of material exposed, and chemicals for its development results.

It is the principal object of the present invention to provide means whereby any desired intermediate length of strip in the focal plane may be employed at will while the remaining part is screened, with means also whereby the winding-off roller is arranged to wind off just the amount of strip which has been uncovered by the screen for exposure.

In the accompanying drawings,

Figure 1 is a sectional view of the apparatus showing the index, interlocking device, and winding-off parts, the blind being approximately half-drawn, and Fig. 2 is a side elevation in projection from Fig. 1 as seen in the direction of the arrow X in Fig. 1 with parts broken away.

Like letters indicate like parts throughout the drawings.

Within the part of the body of the apparatus which constitutes the magazine A, and at its upper part thereof, is situated a carrier or spool B upon which is wound sensitized strip C. The free end of the latter is led by appropriate guiding means over the focal plane D to a winding-off roller $B^1$, whose frictional grip on the strip is obtained by means of an auxiliary roller $B^2$ resiliently thrust against the roller $B^1$ in the known manner to draw off the strip without winding it upon the latter roller. A winding handle $B^3$ is provided upon the roller $B^1$.

Mounted at the upper part of the body A is a roller E upon which is wound a blind F of opaque or non-actinic material. The blind F at its free end is provided with cords $F^1$ or the like, one at each corner, which cords are led over a guide roller $E^1$ at the upper part of the focal plane, along the sides of the latter and around a second guide roller $E^2$ to reels $E^3$ fast upon a rotatable shaft $E^4$. By the rotation of the latter in the appropriate direction the cords $F^1$ are wound on the reels $E^3$ and the blind F is drawn over the focal plane against the resistance of a spring of known type applied to the blind-roller E, the guide-rollers $E^1$ $E^2$ being for this purpose so placed as to cause the blind F to lie close against the sensitized strip C. The width of the blind and the position of the cords $F^1$ is such that the latter do not obscure the surface of the sensitized strip when the blind wholly or partly uncovers it.

Fast upon the shaft $E^4$ is a spur-pinion $E^5$ which meshes with a spur-wheel G fast upon a spindle $G^1$ rotatably mounted in bearings on the side of the body A, and provided with an operating handle $G^2$. The gear-ratio of the spur-wheel G and the pinion $E^5$ is such that one revolution, or slightly less than one revolution of the operating handle $G^2$ actuates the winding-reels $E^3$ to cause them to draw the blind F completely over the sensitized strip in the focal plane, or to withdraw it therefrom, according to the direction in which the reels $E^3$ are rotated.

A disk K is co-axially mounted free upon the spindle $G^1$ and is prevented rotation with it by means of a tongue-piece $K^1$ which extends from the edge of the disk K to a fixed point on the body A of the apparatus.

The tongue-piece $K^1$ further serves the purpose of a stop for the handle $G^2$ in a manner to be hereunder described. The disk K is graduated to represent from a zero point $K^2$ where the handle $G^2$ engages the tongue-piece $K^1$ and the blind F covers the focal plane, the amount by which the said handle $G^2$ must be rotated to cause the blind F to uncover a predetermined length (measured for example in inches) of sensitized strip.

Situated between the index disk K and the spur-wheel G is a second spur-wheel H loosely mounted on the spindle $G^1$ and adapted to mesh with a pinion $H^1$ fast upon the winding-off roller $B^1$. In that face of the spur-wheel H directed toward the operating handle $G^2$ is a series of holes $H^2$, spaced circumferentially to correspond in position and number with the divisions of the index disk K, and adapted to be selectively engaged by a spring-pressed plunger $G^3$ of known form carried by the operating handle $G^2$ and provided with the usual means of holding it in its withdrawn position. When the plunger $G^3$ engages one of the holes $H^2$ the wheel H is thereby locked to the spindle $G^1$ to rotate with the latter. As the acting-end of the plunger $G^3$ is so situated as to extend over the edge of the disk K, the tongue-piece $K^1$ forms a stop which limits the angular movement in either direction of the handle $G^2$, but none the less permits it to make substantially a complete revolution. The spur-wheel G and pinion $E^5$ are so meshed with one another that when the blind F is drawn completely over the focal plane, the handle $G^2$ is at the zero mark on the index disk K and the plunger $G^3$ is against one side of the tongue-piece $K^1$ and is only brought against the other side thereof when the blind F is completely withdrawn to uncover the whole of the sensitized strip in the focal plane.

A friction brake such as that constituted by the spring $G^4$ pressing upon the spur wheel G, or a ratchet and pawl may, if necessary, be employed in conjunction with the spindle $G^1$ to hold it, and thereby also the blind F, in any desired position against accidental movement under the pull of the blind-roller spring, which tends always to roll up the blind and uncover the sensitized strip.

In operation, the sensitized strip is as usual drawn from its spool or carrier B across the focal plane to be engaged at its free end by the winding-off roller $B^1$ in known manner. The blind F is normally drawn completely across the focal plane, thereby covering the sensitized strip, and in this position the handle $G^2$ is at the zero mark on the index K, its plunger $G^3$ being engaged with one of the holes $H^2$ in the spur-wheel H. A certain length of sensitized strip being required for exposure, the plunger $G^3$ is withdrawn from engagement with the wheel H and the handle $G^2$ is rotated from its zero position to the mark on the disk K corresponding with the desired length of strip, whereby the blind-cords $F^1$ are unwound from the reels $E^3$ and the blind F by the action of its spring, aforementioned is wound upon its roller E to uncover the predetermined amount of sensitized strip. The plunger $G^3$ is then engaged with a hole $H^2$ in the wheel H corresponding with the index mark to which the handle $G^2$ has been turned, so that the winding-off roller $B^1$ and the blind-actuating device are then operatively connected with one another again, thus checking, by the resistance to motion of the winding-off means, the tendency for the blind-spring to completely wind up the blind F. After exposure of the sensitized strip, the handle $B^3$ on the winding-off roller B is rotated to wind off the exposed strip, its direction of rotation for this purpose, and its operative connection with the spindle $G^1$ being such that the latter is caused to move in the opposite direction to that in which it was first turned, whereby the handle $G^2$ is returned to its zero on the index disk K, and the blind F moves with the sensitized strip to again cover the focal plane. It will be seen that when the handle $G^2$ returns to zero, the plunger $G^3$ comes into contact with the tongue-piece $K^1$ and thereby arrests the winding-off process just as the full amount of exposed strip has been wound off. The exposed portion of strip is then cut off and developed as usual and the apparatus is then in readiness for another exposure to be made, the various operations being repeated in the manner described.

It will be seen that if desired the handle $B^3$ might be omitted and the handle $G^2$ employed both for setting the blind and for winding off the strip.

To provide ready access to the spool or carrier B for the sensitized strip, and to permit the latter to be easily led across the focal plane when a new spool is inserted in the apparatus, the blind-carrying roller E is supported by vertically-disposed arms L, hinged to the sides of the body A at points $L^1$ situated in front of and near to the middle of the focal plate. These arms L also carry the guide roller $E^1$ adjacent to the blind roller E, and can be turned about their hinge-pins $L^1$ to lie in a horizontal position against a stop $L^2$, so that the blind F, whether drawn or not, can be swung clear of the focal plane when the arms L are turned for that purpose. Stops $L^3$ are also provided on the sides of the body A to locate the arms L, and thus also the blind in their normal position with reference to the focal plane, turn-buttons $L^4$ or the like being provided to there retain them.

It is to be understood that the gear ratio of the wheels H, H¹ is such that, in conjunction with the diameter of the winding-off roller B¹, the movement of the sensitized strip during the winding-off process is in unison with the movement of the blind F.

What I claim as my invention and desire to secure by Letters Patent is:—

1. In feeding and measuring devices for rolls of sensitized strip employed in photographic cameras, the combination of a magazine, a spool for the sensitized strip, a winding-off roller, means for guiding said strip in the focal plane, a blind movable at will to uncover said strip, an index visible from without the camera indicating the position of said blind, and means for interlocking the blind-actuating device with the strip winding-off device, substantially as set forth.

2. In feeding and measuring devices for rolls of sensitized strip employed in photographic cameras, the combination of a magazine, a spool for the sensitized strip, a winding-off roller, means for guiding said strip in the focal plane, a blind movable at will to uncover said strip, an angularly adjustable member for actuating said blind, an index visible from without the camera indicating the degree of such angular adjustment, a second angularly adjustable member co-axial with the blind-adjusting member and operatively connected to the winding-off roller, and means for interlocking said angularly adjustable and co-axial members, substantially as set forth.

3. In feeding and measuring devices for rolls of sensitized strip employed in photographic cameras, the combination of a magazine, a spool for the sensitized strip, a winding-off roller, means for guiding said strip in the focal plane, a blind carried upon a roller, a spring acting on said roller to tend always to withdraw said blind from the focal plane, a roller-member, cords attached one on each side of the blind, and wound upon said roller member thereby to draw said blind across the focal plane, an angularly adjustable disk geared to said roller member, an index to indicate the degree of such angular adjustment, a second angularly adjustable disk geared to the winding-off roller and co-axial with that geared to the blind roller member, and means for interlocking said angularly adjustable and co-axial members, substantially as set forth.

4. In feeding and measuring devices for rolls of sensitized strip employed in photographic cameras, the combination of a magazine, a spool for the sensitized strip, a winding off roller, means for guiding said strip in the focal plane, a blind carried upon a roller, a spring acting on said roller to tend always to withdraw said blind from the focal plane, a roller member, cords attached one on each side of the blind and wound upon said roller member thereby to draw said blind across the focal plane, an angularly adjustable disk geared to said roller member, an index in the form of a graduated circle co-axial with said disk to indicate the degree of angular adjustment given to it, a second angularly adjustable disk geared to the winding-off roller, and co-axial with that geared to the blind roller member, an operating handle for the disk geared to the blind roller member, and a sliding plunger in said operating handle to engage selectively holes corresponding to the marks on the graduated circle and spaced around the disk geared to the winding-off roller, substantially as set forth.

5. In feeding and measuring devices for rolls of sensitized strip employed in photographic cameras, the combination of a magazine, a spool for the sensitized strip in the focal plane, a blind carried upon a roller, a spring acting on said roller to tend always to withdraw said blind from the focal plane, a roller member, cords attached one on each side of the blind and wound upon said roller member thereby to draw said blind across the focal plane, an angularly adjustable disk geared to said roller member, an index in the form of a graduated circle co-xial with said disk to indicate the degree of angular adjustment given to it, a second angularly adjustable disk geared to the winding-off roller, and co-axial with that geared to the blind roller member, an operating handle for the disk geared to the blind roller member, a sliding plunger in said operating handle to engage selectively holes corresponding to the marks on the graduated circle and spaced around the disk geared to the winding-off roller, supporting means for the blind roller hinged about an axis parallel to it and situated about the middle of the focal plane, and stops to locate the supporting means so that the blind can either lie over said focal plane or a portion of it can be moved away from it, substantially as set forth.

In testimony whereof I have signed my name to this specification in the presence of two subscribing witnesses.

LEONARD MILES

Witnesses:
ANNIE LOUISE WADE,
ALBERT BROWN.